US006752520B2

(12) United States Patent
Vernusset et al.

(10) Patent No.: US 6,752,520 B2
(45) Date of Patent: Jun. 22, 2004

(54) FIXING SUPPORT FOR A RECESSED MOUNTING LUMINAIRE

(75) Inventors: Jean-Francois Vernusset, La Ferte-Imbault (FR); Henribert Segret, La Ferte Beauharnais (FR); Nicolas Faye, Saint-Viatre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/264,907

(22) Filed: Oct. 4, 2002

(65) Prior Publication Data

US 2003/0067778 A1 Apr. 10, 2003

(30) Foreign Application Priority Data

Oct. 9, 2001 (FR) .............................................. 01 12980

(51) Int. Cl.[7] ................................................ F21V 17/00
(52) U.S. Cl. ........................ 362/365; 362/148; 362/370; 248/343
(58) Field of Search ................................ 362/368, 370, 362/432, 147, 148, 363, 364, 365; 248/343

(56) References Cited

U.S. PATENT DOCUMENTS

| 5,924,790 A | * | 7/1999 | Ponton et al. ............... 362/370 |
| 5,964,523 A | * | 10/1999 | Eversberg .................... 362/365 |
| 5,967,640 A | * | 10/1999 | Moriyama et al. ........... 362/147 |
| 6,095,660 A | * | 8/2000 | Moriyama et al. ........... 362/147 |
| 6,174,076 B1 | * | 1/2001 | Petrakis et al. .............. 362/365 |
| 6,402,112 B1 | * | 6/2002 | Thomas et al. .............. 248/317 |
| 6,554,458 B1 | * | 4/2003 | Benghozi ..................... 362/365 |

FOREIGN PATENT DOCUMENTS

FR     7202672     9/1972     ........... F21V/21/00

* cited by examiner

*Primary Examiner*—John A. Ward

(57) ABSTRACT

The invention relates to a fixing support (10). The luminaire has a support (10) comprising a locking lug (5), a vertical non-closed barrel (4) and a collar (3). It is characterized in that it is associated to a rod (6) that can release the locking lug from a locked position, an abutment and guidance zone (8) for the locking lug (5), and a spring (7) to exert pressure on said lug (5) such that, when the latter is in the unlocked position, guided by the abutment and guidance zone (8) and by the vertical element (4), it will exert a pressure on a false ceiling (12).

8 Claims, 7 Drawing Sheets

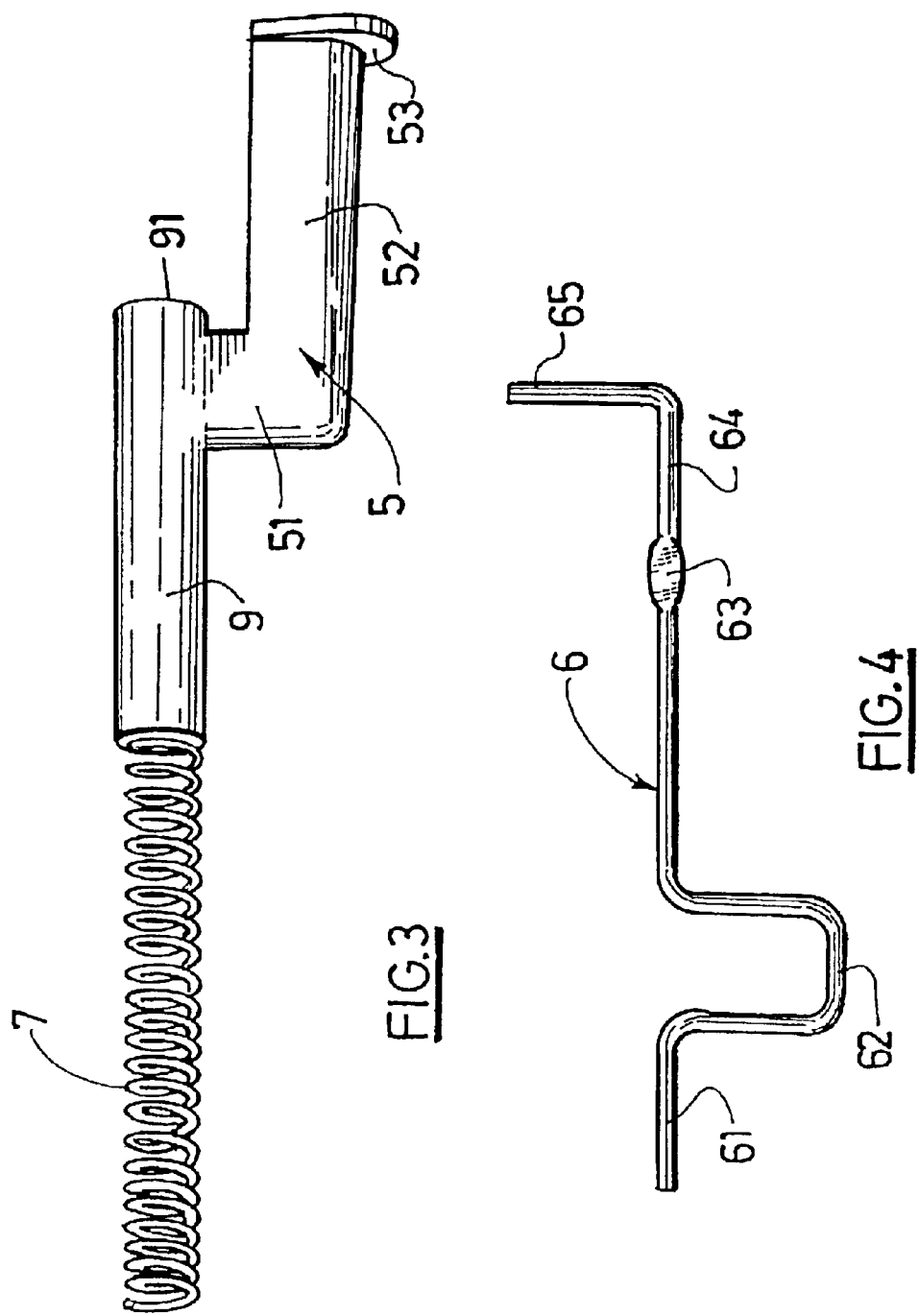

FIXING SUPPORT FOR A RECESSED MOUNTING LUMINAIRE

The present invention relates to a lighting apparatus capable of recessed mounting, comprising a fixing support having a collar, a locking lug, and a vertical element, the lug being capable of movement from a locked position into an unlocked position.

It finds a particular application especially for luminaires recessed in a false ceiling.

Japanese patent 10289615 describes a luminaire comprising:
- a lug that can be moved from a locked position into an unlocked position, the lug being fixed to a vertical element,
- a screw included in said vertical element,
- a first collar, and
- a second collar.

In order to insert and hold the luminaire in a false ceiling, the following steps are performed. The luminaire is inserted in an orifice situated in the false ceiling. The screw is turned through 90° with a screwdriver in order to release the lug from its locked position to its unlocked position. Subsequently the screw is unscrewed in order to lower the lug, the lug being guided by the vertical element. Unscrewing is carried out completely until the lug abuts against the first collar. The lug bears on the first collar. The false ceiling is then held between the first collar, which is situated inside the false ceiling, and the second collar, which is situated outside the false ceiling. The luminaire is thus fixed.

The major drawback of such a luminaire lies in the fact that it requires too much effort and time for installing the luminaire. This is because it is necessary in particular to unscrew the screw completely.

Thus one technical problem to be resolved by the present invention is to propose a lighting apparatus capable of recessed mounting and comprising a fixing support, the support having a collar, a locking lug and a vertical element, which lug can be moved from a locked position into an unlocked position, as well as such a fixing support, which render it possible to install such an apparatus quickly and without too much effort.

One solution to the technical problem posed is characterized in that the lighting apparatus has a rod that can release said locking lug from its locked position, a zone for abutment and guidance of the locking lug, and a spring that can exert a pressure on said locking lug when the latter is in an unlocked position such that the lug, guided by the abutment and guidance area and by the vertical element, exerts a pressure on a false ceiling.

According to a second object of the present invention, this solution is characterized in that the fixing support has an abutment and guidance zone and is associated with a rod that can release the locking lug from its locked position and with a spring that can exert a pressure on said locking lug such that, when the latter is in the unlocked position, guided by the abutment and guiding zone and by the vertical element, it exerts a pressure on a false ceiling.

Thus, as will be seen in detail below, the rod makes it possible to push without effort on the locking lug in order to release it. Subsequently, said lug is automatically pressed against the false ceiling by virtue of the spring which exerts a pressure on the lug. Consequently, said false ceiling is held between said lug and the collar. The lighting apparatus is fixed.

The invention will be further described with reference to examples of embodiments shown in the drawings to which, however, the invention is not restricted.

FIG. 3 illustrates a rod, an element of the lighting apparatus of FIG. 1,

Figure 1:
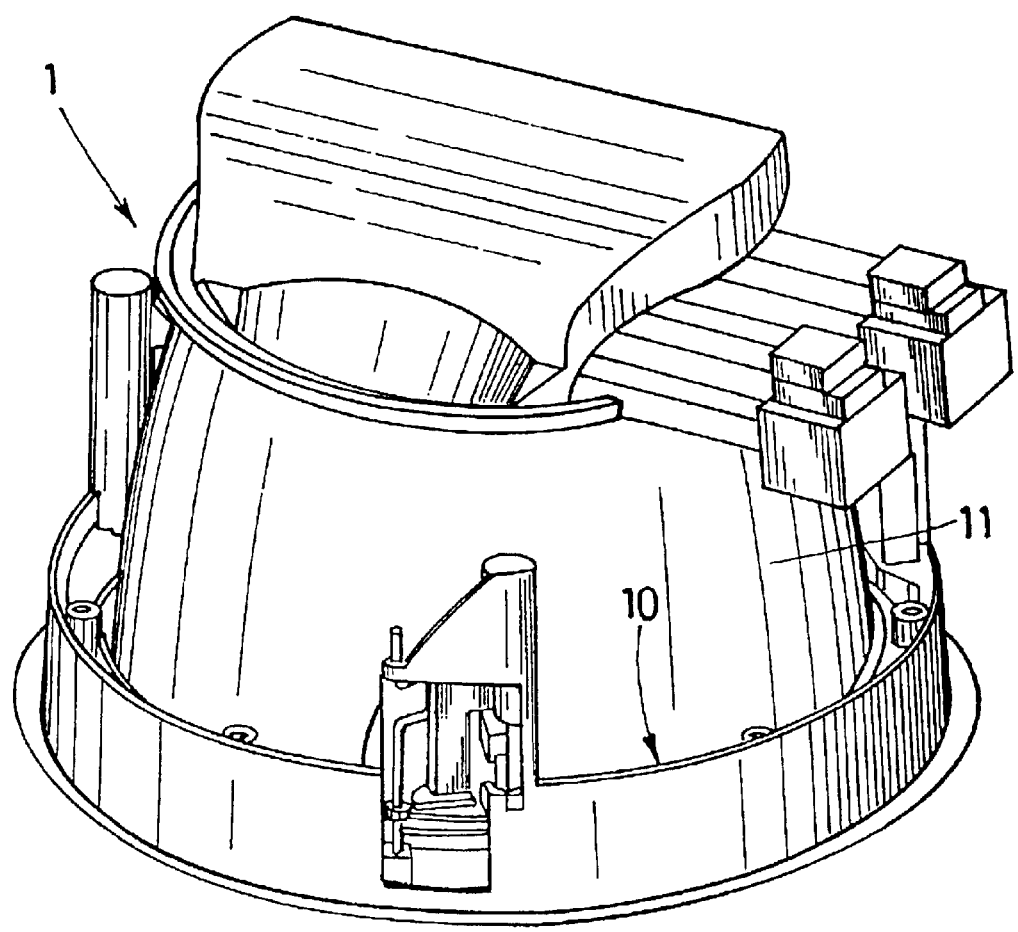
FIG. 1 is an overall view of a lighting apparatus according to the invention.
Figure 5:
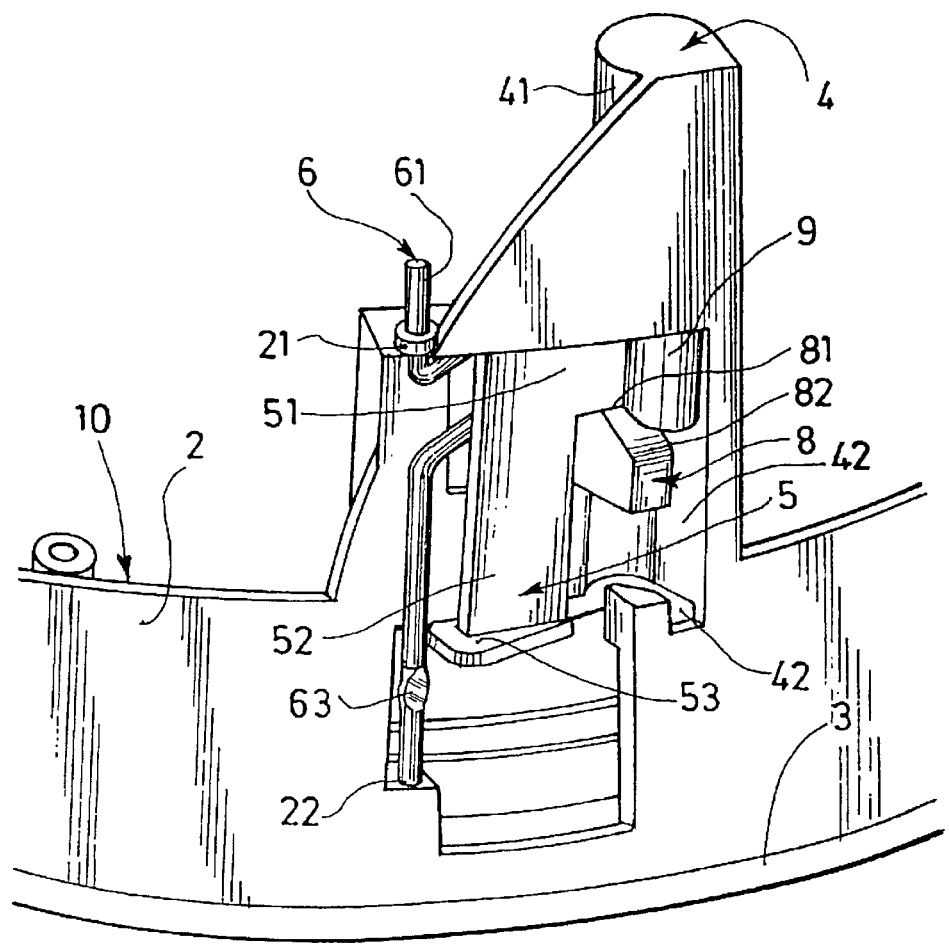
Figure 6:
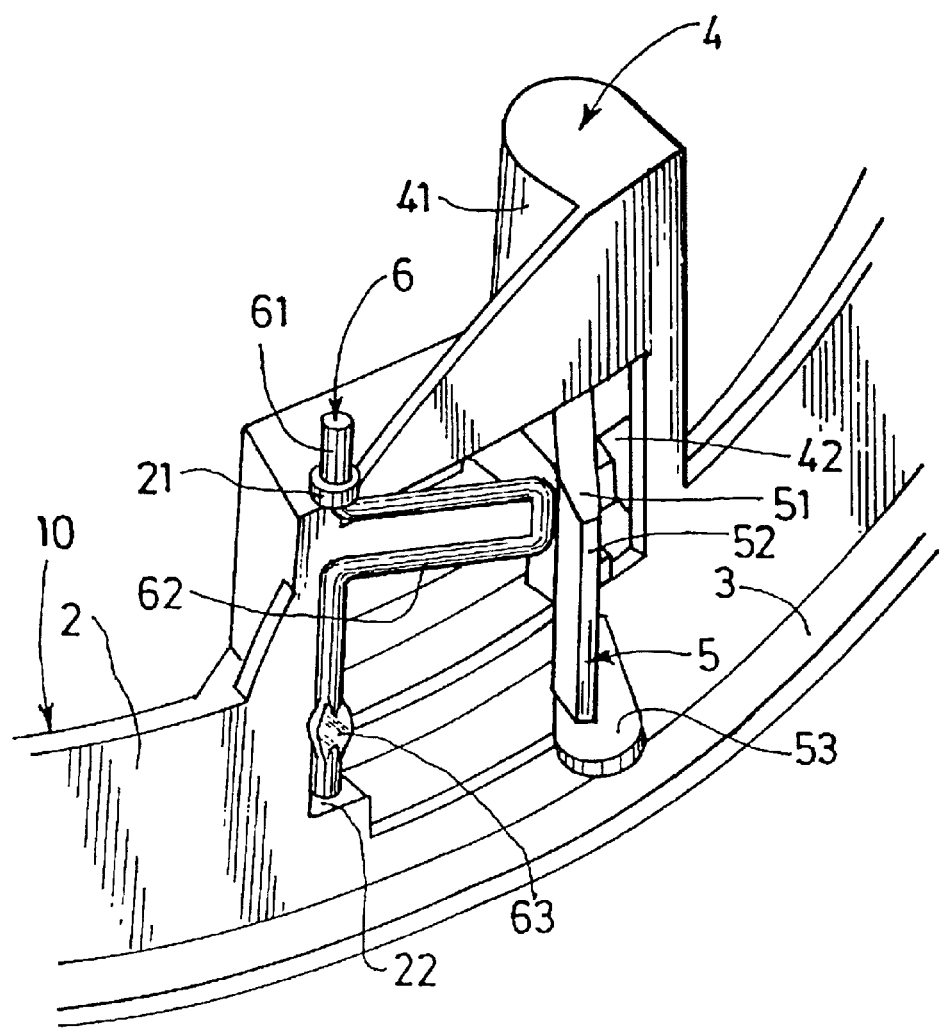
Figure 7:
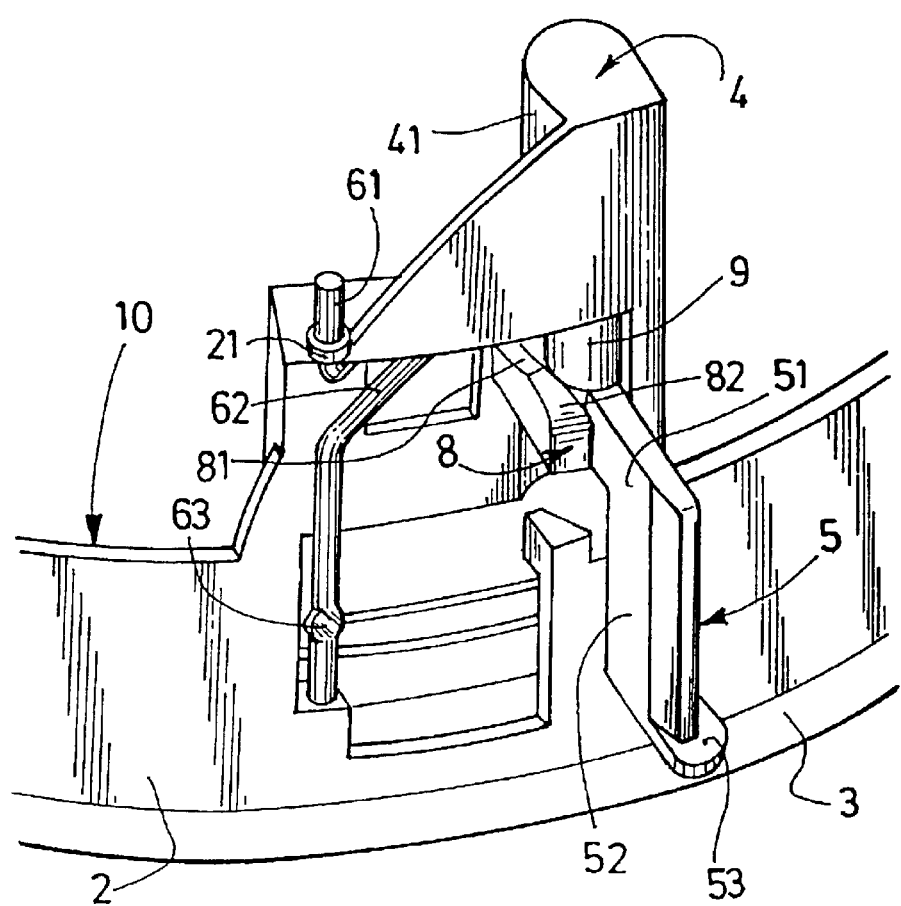
Figure 8:
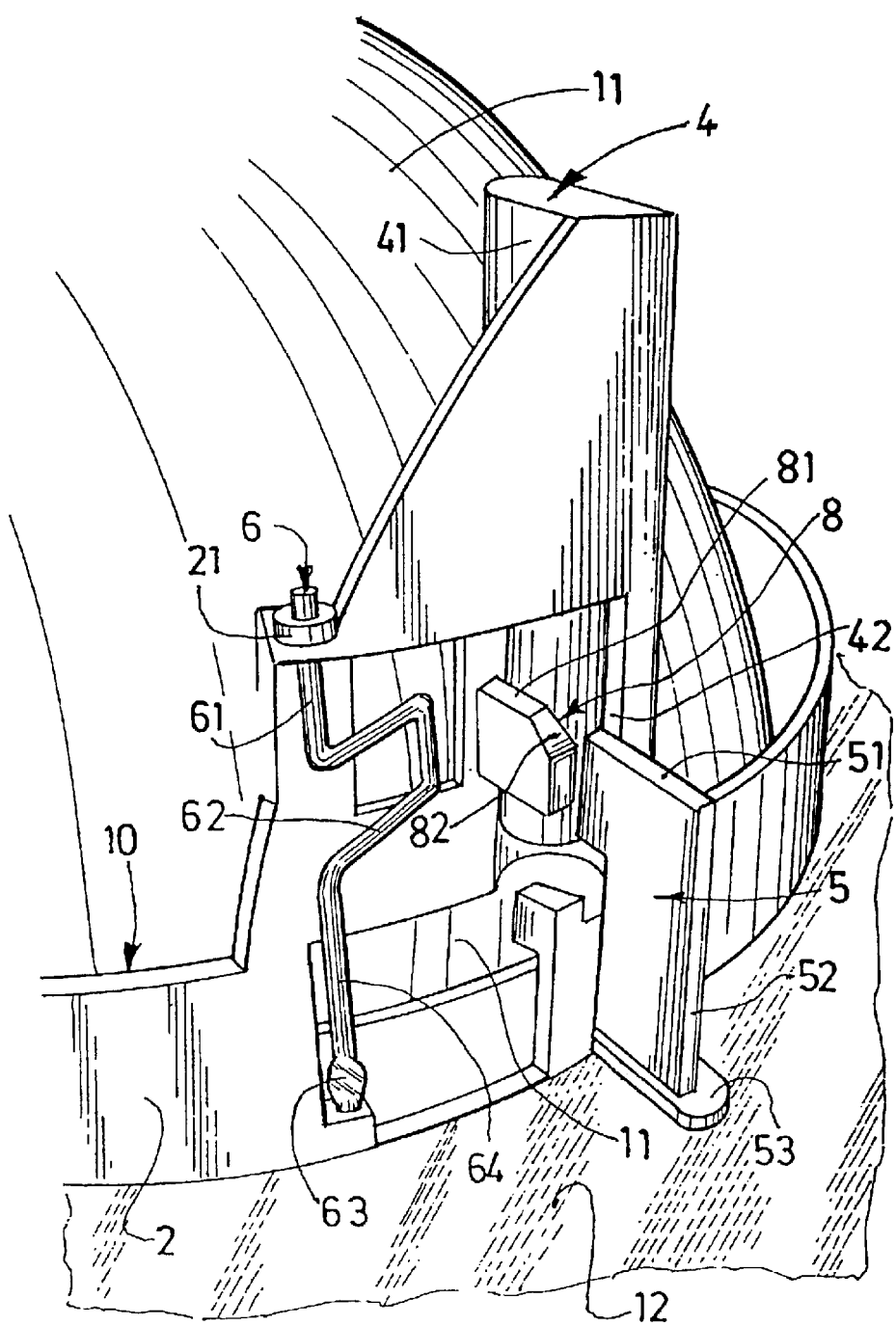

FIG. 4 illustrates a spring and a lug, elements of the lighting apparatus of FIG. 1, FIG. 5 is a second partial representation of the lighting apparatus according to the invention when it is not fixed to a false ceiling, FIG. 6 is a third partial representation of the lighting apparatus according to the invention in an intermediate position, FIG. 7 is a fourth partial representation of the lighting apparatus according to the invention when it is fixed to a false ceiling, FIG. 8 is a fifth partial representation of the lighting apparatus according to the invention in the position of holding on to a false ceiling.

The present disclosure of the invention relates to an example of a luminaire which can be mounted in a false ceiling.

Figure 2:
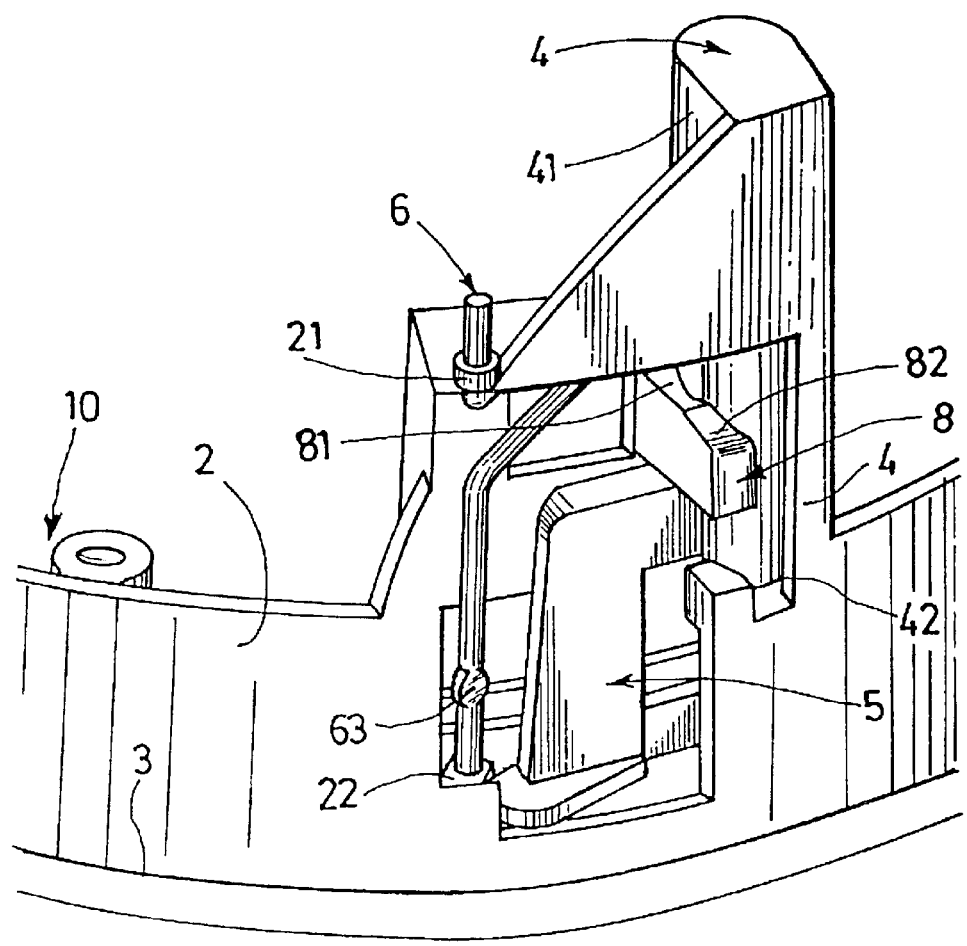
FIG. 2 is a first partial representation of a lighting apparatus of FIG. 1.

As depicted in FIG. 1, the luminaire 1 comprises a reflector 11 mounted on a preferably removable fixing support 10. The reflector 11 is mounted on the support 10 in a manner known to those skilled in the art and is therefore not described here. As shown in FIG. 2, the fixing support 10 is preferably cylindrical and comprises:
- a base 2,
- a collar 3,
- a locking lug 5,
- a vertical element 4,
- an abutment and guidance zone 8 comprising a first, horizontal abutment subzone 81 and a second, sloping guidance subzone 82,
- means 21 for holding a rod, and
- means 22 for fixing a rod.

The collar 3 is preferably manufactured from a synthetic material or metal material. It serves as an interface between the lighting apparatus 1 and the false ceiling.

The locking lug 5 is depicted in FIG. 3. It is preferably manufactured from a synthetic material or metal material. It comprises a horizontal part 51 connected to a vertical part 52, the latter connected to a support 53. Said three elements preferably form an integral assembly and are molded together. The locking lug 5 makes it possible to bear on the false ceiling.

The vertical element 4 is preferentially a non-closed barrel comprising a housing 41 and a slot 42. Said vertical element 4 is fixed to the collar 3 which holds it. It is preferably manufactured from a synthetic material or metal material. It makes it possible to guide the locking lug 5 vertically by means of its slot 42. It also makes it possible to receive a spring 7 in its housing 41 and retains it vertically.

The spring 7 is preferentially made from steel. It is shown in FIG. 3. It makes it possible to push on the locking lug 5. It is connected to the lug 5 by means of a centering protrusion 9. The spring 7 is preferentially inserted into said boss 9.

The centering boss 9 comprises a recess 91 that can receive a tool such as a screwdriver head. The centering boss 9 is preferably also molded with the other components of the lug 5.

The abutment and guidance zone 8 of the fixing support 10 is preferably manufactured from a synthetic material or metal material. The first, horizontal abutment subzone 81 makes it possible to held 4 the locking lug 5 in a locked position, whilst a second, sloping guidance subzone 82 makes it possible to initiates and drives a movement of the locking lug 5 and guides it when it is in the unlocked position.

The luminaire 1 also comprises a rod 6. The rod 6 is preferably manufactured from a metal. It has, for example, a diameter of 3 mm. It is depicted in FIG. 4. It has a vertical top part 61, a camber 62, a flat surface 63, a vertical bottom part 64, and a sleeve 65 preferably perpendicular to the bottom part 64. The rod 6 renders it possible to move the locking lug 5.

Preferably, the collar 3, the vertical non-closed barrel 4, and the abutment zone 8 form a single assembly integral with the base 2 of the fixing support 10 and are all molded together. This has the advantage of reducing the cost of the lighting apparatus: no fixing means is used between its components. In addition, this has the advantage of having, grouped together in a single mass various functions corresponding to the collar 3, the vertical non-closed valve 4, the abutment zone 8, and the base 2 of the fixing support 10. This mass can be reused in association with the rod 6 and the spring 7 in other applications such as mounting of baffles for fixing loudspeakers to a removable fixing support, the loudspeaker in this case replacing the reflector 11.

In order to fix the luminaire 1 in the false ceiling, the following steps are performed.

In a first step, the rod 6 is vertically introduced into the fixing support 10. It is held vertical by said support 10 by virtue of the holding means 21, which are here a hollow high boss, and by virtue of the fixing means 22 which are, for example, a clip situated at the bottom of the base 2. The top part 61 of the rod is inserted into the high boss 21, the diameter of which is more or less greater than that of the rod 6, said boss making it possible to retain the rod 6. The bottom part 64 of the rod is inserted into the clip 22, whose diameter is substantially greater than that of the rod 6, said clip preventing the rod from having a clearance; it is a tight fit. Subsequently, the rod 6 is pushed vertically upwards in order to keep it in place.

The sleeve 65 of the rod 6 is pressed against the base 2 of the fixing support 10. It is situated above the collar 3 inside said base 2.

In a second step, the locking lug 5 is locked by putting it in the locked position. As is shown in FIG. 5 for this locked position, the horizontal part 51 of the lug 5 is fixed to the horizontal abutment subzone 81 of the abutment and guidance zone 8, and said lug 5 is retracted inside the base 2 of the fixing support 10. The camber 62 of the rod 6 is placed behind the vertical part 52 of the lug 5. The spring 7 is compressed and is situated in the housing 41 in the non-closed barrel 4, as is the centering boss 9.

In a third step, the luminaire 1 is inserted into an orifice (not shown) of adapted shape, provided in the false ceiling, the collar 3 remaining outside the false ceiling.

In a fourth step, the sleeve 65 of the rod 6 is gripped, preferably by hand, and the rod 6 is pulled approximately 10 mm vertically downwards, the top boss 21 guiding the rod 6 vertically. The flat surface 63 abuts against the clip 22, which stops the rod 6 with respect to translation and thus prevents it from going lower. The sleeve 65 then leaves the base 2 in downward direction and is situated at a level lower than the collar 3. This will make it possible to manipulate the rod 6.

In a fifth step depicted in FIG. 6, the sleeve 65 is turned towards the inside of the base 2 so that a thrust along a longitudinal axis is applied to the rod 6, which effects a rotation. Consequently, the camber 62 on the rod 6 effects a rotation towards the outside of said base 2 and pushes against the horizontal part 51 and the vertical part 52 of the locking lug 5. Turning the sleeve 65 through approximately 90° releases the locking lug 5, which moves in translation on the horizontal abutment subzone 81 until it engages on the sloped guidance subzone 82 whilst effecting a rotation with respect to a vertical axis of the centering boss 9. The locking lug 5 is then in an intermediate position. The high horizontal part 51 and the low vertical part 52 as well as the support 53 of the locking lug 5 are outside the base 2 as a result.

In a sixth step, the spring 7, which exerts a permanent pressure on the locking lug 5 by means of the centering boss 9, makes the locking lug 5 slide on the sloping guidance subzone 82. Said sloping guidance subzone 82 then initiates and drives the movement of said lug downwards. The advantage of this sloping guidance subzone 82 is that it releases the locking lug 5 more rapidly.

The latter then slides along the slot 42 of in the barrel 4, which holds said lug 5 perpendicular to the false ceiling, as shown in FIG. 7. Subsequently the locking lug 5 ends its travel on the false ceiling 12.

Thus the locking lug 5 is completely released and its support 53 is pressed on the false ceiling. Said lug 5 thus exerts a pressure on the false ceiling 12 so that the latter is held between the collar 3 and the locking lug 5, as shown in FIG. 8. The collar makes it possible to held the whole of the luminaire 1 against the false ceiling.

In a last step, either the rod 6 is stored by pushing it vertically upwards and effecting a further rotation through 90° in the opposite direction by means of the sleeve 65, the sleeve 65 of the rod 6 being once again pressed against the base 2, or the rod 6 is withdrawn by pulling it vertically by means of the sleeve 65 in order to make its top part 61 emerge from the top boss 21 and then by pulling on it transversely in order to make it emerge from the clip 22.

It should be noted that the sloping guidance subzone 82 has an additional advantage which is avoiding having a camber 62 on the rod 6, which is too long horizontally. This is because, were this subzone 82 to be vertical, a longer camber 62 would be needed for initiating the descent of the locking lug 5, and there would be a great risk of this camber 62 being jammed behind the abutment and guidance zone 8.

In order to dismantle the luminaire 1, for example when it is necessary to change a component such as a socket or ballast of said luminaire, a tool such as a screwdriver is inserted in the bottom part of the non-closed barrel 4 of the fixing support 10, and the head of this tool is placed in the recess 91 of the centering boss 9 which is connected to the locking lug 5 and to the spring 7. A pressure force is exerted with the screwdriver on the spring 7 via the centering boss 9 by pressing on said boss 9. A thrust is exerted upwards until the recess 91 of the centering boss 9 is situated level with the horizontal support subzone 81. Subsequently, the locking lug 5 is turned through 90° towards the inside of the base 2 in order to reload it. Said locking lug 5 is then locked by placing it on the horizontal abutment subzone 81. The spring 7 is thus reload by virtue of the centering boss 9 and the luminaire 1 can be dismantled without any problems of the false ceiling, without damaging the latter or a part of the luminaire 1 itself or also a part of its support 10. The luminaire 1 can be refixed with no damages as described before.

Obviously, the scope of the invention is in no way limited to the embodiments described above and variations or modifications can be made thereto without departing from the spirit and scope of the invention. The object of the invention extends, for example, to other embodiments of which, for example, other shapes for the vertical element 4 are used or other materials are used.

Obviously, the fixing support which is the object of the invention is in no way limited to the application described above, and extends, for example, to other applications such as loudspeaker baffles.

No reference sign in the present text must be interpreted as limiting said text.

The verb "comprise" and its conjugations should also not be interpreted limitingly, i.e. they must not be interpreted as excluding the presence of steps or elements other than those defined in the description, or as excluding a plurality of steps or elements already listed after said verb and preceded by the article "a" or "one".

What is claimed is:

1. A lighting apparatus (1) capable of recessed mounting, comprising a fixing support (10), the support having a collar (3), a locking lug (5) and a vertical element (4), said lug (5) being capable of movement from a locked position into an unlocked position, characterized in that it has a rod (6) that can release the locking lug (5) from its locked position, an abutment and guidance zone (8) for the locking lug (5) and a spring (7) that can exert a pressure on said locking lug (5) such that, when the latter is in the unlocked position, guided by the abutment and guidance zone (8) and by the vertical element (4), it will exert a pressure on a false ceiling (12), further comprising a centering boss (9) linking the lug (5) to the spring (7), said boss (9) making it possible to reload said springs.

2. A lighting apparatus (1) capable of recessed mounting as claimed in claim 1, characterized in that the abutment and guidance zone (8) comprises a horizontal abutment subzone (81) and a sloping guidance subzone (82), capable of holding the locking lug (5) in the locked position and of guiding the locking lug (5) when it is in the unlocked position, respectively.

3. A lighting apparatus (1) capable of recessed mounting, also having a base (2), as claimed in claim 1, characterized in that the collar (3), the vertical element (4), and the abutment zone (8) form an integral assembly with said base (2).

4. A lighting apparatus (1) capable of recessed mounting as claimed in claim 1, characterized in that the rod (6) has a camber (62) that can push against the locking lug (5).

5. A fixing support (10) comprising a collar (3), a locking lug (5) and a vertical element (4), which lug (5) can be moved from a locked position into an unlocked position, characterized in that it has an abutment and guidance zone for the locking lug (5), and in that it is associated with a rod (6) that can release the locking lug (5) from its locked position and with a spring (7) that can exert a pressure on said locking lug (5) such that, when the latter is in the unlocked position, guided by the abutment and guidance zone (8) and by the vertical element (4), it will exert a pressure on a false ceiling (12), further comprising a centering boss (9) linking the lug (5) to the spring (7), said boss (9) making it possible to reload said spring (7).

6. A fixing support (10) as claimed in claim 5, characterized in that the abutment and guidance zone (8) comprises a horizontal abutment subzone (81) and a sloping guidance subzone (82) capable of holding the locking lug (5) in the locked position and of guiding the locking lug (5) when it is in the unlocked position, respectively.

7. A fixing support (10), also having a base (2), as claimed in claim 5, characterized in that the collar (3), the vertical element (4), and the abutment zone (8) form an integral assembly with said base (2).

8. A lighting apparatus (1) capable of recessed mounting, comprising a fixing support (10), the support having a collar (3), a locking lug (5) and a vertical element (4), said lug (5) being capable of movement from a locked position into an unlocked position, characterized in that it has a rod (6) that can release the locking lug (5) from its locked position, an abutment and guidance zone (8) for the locking lug (5), and a spring (7) that can exert a pressure on said locking lug (5) such that, when the latter is in the unlocked position, guided by the abutment and guidance zone (8) and by the vertical element (4), it will exert a pressure on a false ceiling (12), wherein said rod (6) has a camber (62) that can push against the locking lug (5).

\* \* \* \* \*